United States Patent Office 2,776,537
Patented Jan. 8, 1957

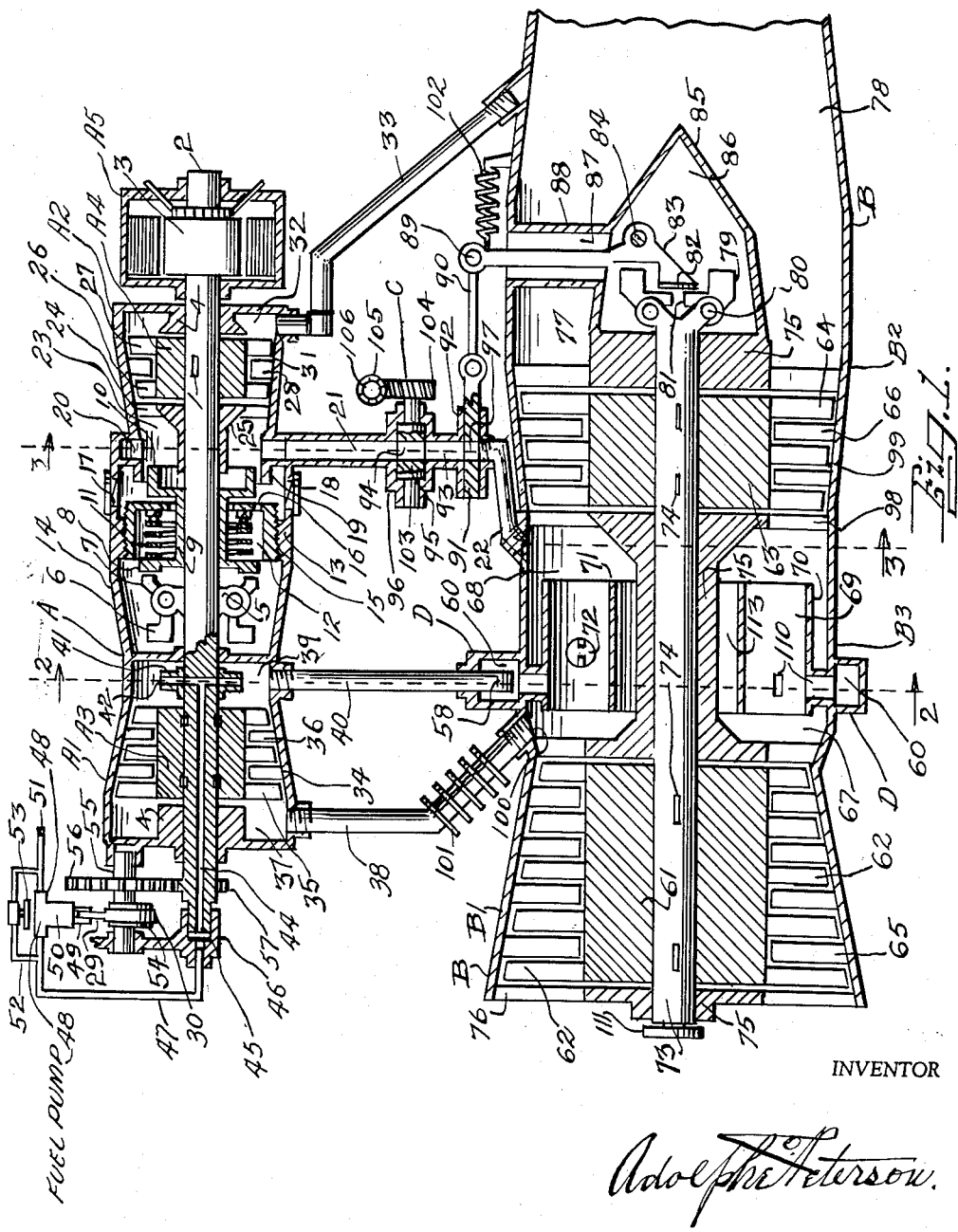

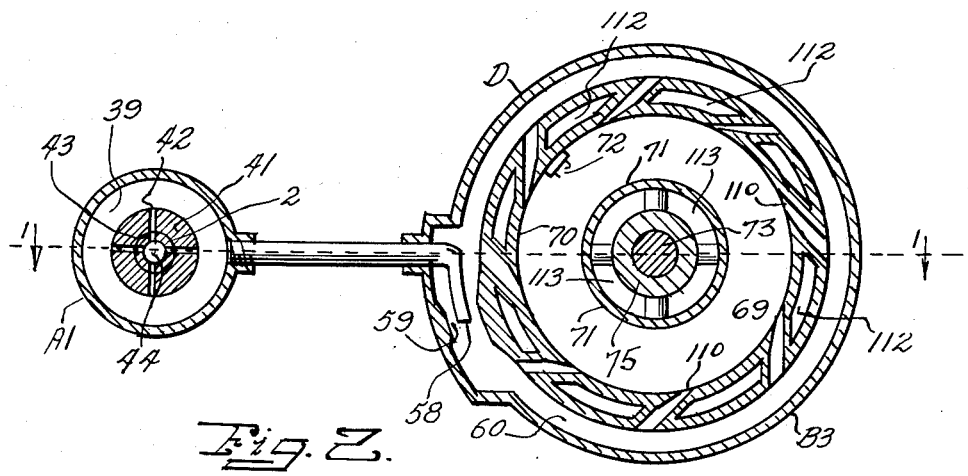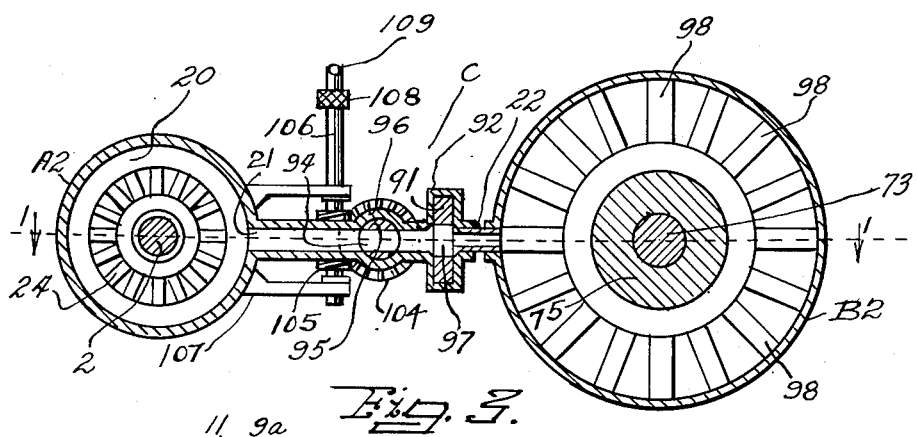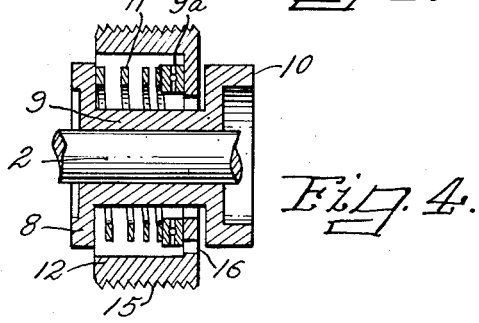

2,776,537
FUEL SUPPLY AND CONTROL MEANS FOR TURBINES AND TURBINE JETS

Adolphe C. Peterson, Minneapolis, Minn.

Application April 20, 1953, Serial No. 349,859

18 Claims. (Cl. 60—39.15)

My invention relates to turbine means and especially to fuel supply and control means for turbines, so my invention is therefore called fuel supply and control means for turbines and turbine jets.

The main objects of my invention are, one; to provide a form of fuel supply means to turbines and turbine jets which means shall have simplicity and reliability in its construction and use and which shall procure improved dissemination of the fuel supply into the air stream so that combustion is therefore more certainly complete and substantially instantaneous, and to provide for construction of such fuel supply means by a means which shall because of its simplicity in fuel distribution, provide such means for turbines and turbine jets at lesser cost than those fuel systems which are now in use for such purposes; second; to provide in conjunction with this improved means for supply of fuel to turbines and turbine jets, an improved form of control for turbines and turbine jets, which control means shall be more reliable in its use, more simple in its construction, and therefore also of less cost in its construction.

An object is to provide a form of fuel supply and control means for turbines and turbine jet engines, which means shall be constructed principally as a complete unit, which is chiefly self-contained in that unit, and which because of its unit and self contained construction, shall be capable of easy assembly with any of the usual types of power turbines and turbine jets, and which because of this unit construction, and its method of fuel supply and control, shall also be capable of application to and use with different types and sizes of turbines and turbine jets. A chief object is to provide such means in a form which is because of the features which have been stated, a considerable improvement over the existing types of fuel supply and control means for turbines and turbine jet propulsion means, and to provide such means in a form which is readily applicable to and interchangeable with the various types of military planes, their engine means, especially for fighter and bomber planes, and which is also useful in the same manner, for the commercial types of airplanes.

The principal devices and combinations of devices, comprising my invention, are as hereinafter described and as defined in the appended claims. In the accompanying drawings, which illustrate my invention, like characters refer to like parts throughout the drawings.

Referring to the drawings:

Figure 1 is an illustration of a horizontal section on a plane passing through the axial centers of the principal units and the axes of the operating units of the device, this view showing the fuel and control unit as applied to a main or power turbine for turbine power development or for turbine jet propulsion; some parts being shown in plan view, and some parts broken away, the section being on lines 1—1 of Figures 2 and 3.

Figure 2 is a cross section on a vertical plane at right angles to the plane of Figure 1, this cross section being taken on the line 2—2 of Figure 1.

Figure 3 is a vertical cross section at right angles to that of Figure 1, on the angling line 3—3 of Figure 1.

Figure 4 is a detail figure showing, in enlarged scale, the members 8, 9, 11, and 12 and the short section of shaft 2 within member 9, the shaft 2 being broken away adjacent that member 9, the section being on a plane which is that of Figure 1.

Referring to the figures from 1 to 3, inclusive, there are here shown two principal units, one of which designated A is the fuel supply and control means constituting the main elements of my device, and another of which is designated B, which latter unit is the illustration (chiefly diagrammatic) of a larger unit which is a main turbine which may be used for airplane propeller driving, or may be used for jet propulsion of airplanes, or which may be used for any other power utilizing devices or power applications. A control means is generally C.

Referring now, first to the unit which is designated as A, this unit A contains the chief elements of the fuel supply and also the principal element of the control means for the main turbine engine, there being other supplementary control means for the device and the main power engine which is designated, generally, as C. There is also a supplementary fuel distribution means for the main power engine, which is a part of my fuel supply system and which is generally designated as D in the drawings.

The unit A has included as parts of it the compressor casing A1, the turbine casing A2, the compressor rotor A3, the turbine rotor A4, the electric starter motor A5. The compressor rotor and the turbine rotor, A3 and A4, respectively, are mounted on and secured by means of key means 1, to a common shaft 2 and the latter has fixed thereon the armature 3 of the starter motor A5 and the shaft 2 is rotatably mounted in the bearings generally designated 4, this common shaft 2 being a shaft which is part of the fuel supply and control unit A and is not operably connected in any way as a rotatable unit with the rotor shaft of the main engine unit B. The shaft 2 has fixed thereon by means of bracketed pivots 5, the weighted governor arms 6 which constitute the centrifugally controlled weight arms of a centrifugal governor, and which have formed with or joined with them the levers 7 which extend from the pivots radially outwardly of the shaft 2 and which may when swung on their pivots 5 by the centrifugal force upon the weighted governor arms 6, contact the flange 8 which is annular in form and is formed on a sleeve 9 which has also a cylindrical or sleeve type valve 10 formed with or joined with it, the flange 8, sleeve 9, and sleeve valve 10 moving slidably on the shaft 2, that is axially of shaft 2, under the action of the governor weight arms 6, one way, and under the action of a coil spring 11, the other way. The coil spring 11 is mounted around the shaft 2 and is interposed between the flange 8 and an annular collar 12, the collar 12 being a stationary collar which is mounted by means of bracket means 13 in the interior of the surrounding casing part 14 which is joined with and interposed between the compressor casing A1 and the turbine casing A2. There is an anti-friction ball-bearing between the rightward end of the coil spring 11 and the adjacent face of the collar 12, as appears more clearly in the enlarged detail figure, Figure 4, where the ball-bearing is designated 9a. The relatively stationary collar 12 has a screw thread formed exteriorly of it and designated 15 this screw thread cooperating with an internal screw thread within the bracket means 13, so that the relatively stationary collar 12 may thereby be adjusted for adjustment of the pressure upon the coil spring 11, by axial movement of the collar. The collar 12 may be adjusted in any manner, when the turbine is not in use, by means of sockets 16 formed in its end. There are provided openings 17 in the casing part 14 which are normally covered and closed by means of caps 18. The collar 12 is not intended to be adjustable during actual operation of the turbine, since it is intended only that any means such as the screw threaded adjustment means 15 is or may be provided for adjusting the compression of the coil spring 11 during assemblage of the unit or overhaul, so that the coil spring 11 will be of such a resisting force that the speed of the shaft 2 will be positively limited to a speed not in excess of a maximum permissible speed. This maximum permissible speed is contemplated to be a speed, which will not only not exceed a safe speed for shaft 2 and its associated elements, but which also will not exceed such as will result in the delivery of a volume of fuel from nozzle 58 for combustion in chamber 69 in a not excessive volume per unit of time.

The sleeve valve 10 has a rather large internal diameter, and has an external diameter which is just sufficiently under the internal diameter of a surrounding stationary sleeve casing 19 so that the sleeve valve 10 may, when moved rightwardly in Figure 1, serve to partially close or even to fully close the annular port 20 which is formed in sleeve casing 19. The annular port 20 has an opening thereto, 21, which by means to be described joins the end of a gas conduit 22 which as hereinafter described receives combustion gases from the unit B and is controlled as hereinafter described. There is formed within the sleeve casing 19 and adjacent thereto rightwardly, Figure 1, an annular space 23 which is an inlet chamber and nozzle chamber for the turbine rotor A4 and has discharging therefrom, rightwardly, the nozzles formed between the guide blades 24 which are stationary and fixed to the casing of the turbine and also to the bearing 25 of the shaft 2. The nozzles thus formed between guide blades 24 discharge rightwardly against the blades 26 which are a first stage of blades on turbine rotor A4. Subsequently there are turbine blades in stage 27 fixed on turbine rotor A4, and there are intermediate stator blades 28 fixed in the turbine casing A2.

The annular turbine course 31 within casing A2, and in which the turbine rotor A4 rotates, discharges to exhaust chamber 32 and that discharges through a discharge conduit 33, the latter being connected with the jet tube of the main unit B, as hereafter described. The compressor rotor A3 is mounted and is rotatable in a compressor course 34 within the casing A1 and the compressor blades 35 fixed on compressor rotor A3 rotate in that course, there being intermediately disposed the stator compressor blades 36 which are fixed in the compressor casing A1. The compressor casing A1 has formed in one end the intake chamber 37 which receives compressed air by way of pipe 38 as hereinafter described, and it has formed at the other end the compressed air discharge chamber 39 which discharges air as further or more greatly compressed, by way of pipe 40, to the main unit B, there being however a distributing means interposed, as hereinafter described.

The pipe 38 which receives compressed air at the pressure as normally compressed by unit B, provides the atmospheric air for a greater compression, that is a pressure above that provided by the compressor of the main unit B. Thus air discharging through discharge chamber 39 is at a pressure which may be say twenty or more pounds greater than the pressure of the compressed air supply in the main unit B. It is intended that that increased pressure be sufficiently greater, so that the distributing function, as hereafter described, may be performed. There is mounted on the shaft 2 within the space of the discharge chamber 39 of the compressor casing A1, to rotate with shaft 2, a fuel discharging disk 41 which has a number of fuel nozzles 42 which are relatively long and which pass radially through the disk 41 from ports 43 formed in shaft 2 centrally of fuel disk 41, the ports 43 receiving fuel through a conduit 44 formed in the shaft 2 and passing leftwardly through that shaft 2, to be open to a fuel port 45 formed adjacent its open end in the fuel housing 46 which is mounted on the end of the shaft 2, leftwardly, as a bearing on shaft 2, the fuel housing 46 being stationary and receiving fuel by pipe 47 from the fuel pump 48 which has a reciprocating pump plunger 49 reciprocating in the casing 50, the pump receiving fuel from a supply conduit 51 from any tank source of fuel. A bypass pipe 52 controlled by by-pass valve 53, may by-pass fuel, but this by-pass valve 53 is generally always closed in operation, so that no fuel is by-passed, this being provided merely as an auxiliary control to ensure stopping of the fuel supply, when necessary.

The distributing means which has been above mentioned is formed as a part of the main engine unit B to receive a mixture of fuel and compressed air from discharge chamber 39 of the unit A. The fuel pump plunger 49 is reciprocated by eccentric rod 29 which has the eccentric strap 30 in which the eccentric 54 is rotatable, the eccentric 54 being fixed on a short shaft 55, the latter being driven by the large spur gear 56 which is in permanent geared drive with the small spur gear 57 which is formed on or fixed on shaft 2 at the left end thereof, Figure 1. The pump plunger 49 is accordingly always driven when shaft 2 is driven and is always in coordinated drive with shaft 2 at a speed which is always in proportion to the speed of shaft 2. Thus the quantity of fuel which is pumped from the supply pipe 51 is always in proportion to the speed of rotation of the shaft 2 and that speed is controlled as hereafter described. The supply of fuel is also substantially in proportion to the supply of air which is compressed at the higher pressure by the compressor rotor A3 of unit A1.

The mixture of compressed air and admixed fuel passes from the chamber 39 through pipe 40, to a nozzle 58 (Figure 2) and this nozzle 58 discharges into a venturi throat 59 of the distributing chamber 60 which is annular in form and surrounds the intermediate section of the power turbine B. The power turbine B will be now particularly described. This unit has compressor casing B1, turbine casing B2, intermediate casing section B3, and it has power turbine compressor rotor 61 with compressor rotor blades 62, power turbine rotor 63 with power turbine rotor blades 64, compressor stator blades 65, turbine stator blades 66, compressed air discharge chamber 67, turbine gas chamber 68, annular combustion chamber 69 formed between the combustion chamber walls 70, 71, each of annular form and one within the other forming the combustion chamber 69 therebetween, ignition means 72, power turbine shaft 73 on which the power turbine compressor or rotor 61 and the power turbine rotor 63 are securely fixed by key means 74 to rotate as a unit therewith, shaft bearings 75, air intake 76 for atmospheric air, annular discharge chamber 77 discharging to jet tube 78 which expels gases to atmosphere rearwardly as in turbine jets, centrifugal governor weight arms 79 mounted by pivots 80 on the rightward end of shaft 73 to rotate therewith, and governor levers 81 on opposite ends of arms 79.

The governor levers 81 are, when the speed of shaft 73 exceeds a predetermined rotation speed, which may be say ten thousand or more per minute, swung on their pivots 80 to contact a lever disk 82 on the lower end of lever 83 and to swing that lower end with it on the pivot 84 of lever 83, the pivot 84 being mounted in the tail cone 85 which is formed with or fixed on the rear end of the rear bearing 75, there being a closed chamber 86 within which the governor just described is rotatable. The lever 83 at its upper end extends upwardly, as in Fig. 1, through the hollow interior space 87 of a strut 88 to which the tail cone 85 is fixed for support. The opposite end of the lever 83 is connected by a pivot 89 to link 90 which in turn is connected at its opposite end to the flat type, main governor control valve 91. The latter control valve is mounted in a valve casing 92 to be slidable therein to close the passage 93 therein, which normally connects the pipe 22 (gas conduit)

through a port 94, in a cylindrical hand control or pilot controlled valve 95 rotatable in its casing 96, with duct 21 which is open to the annular port 20, so that thus, when these valves are so stationed that there is passage through their ports 94 and 97 (in valve 91), then gases may flow under pressure and with the heat of combustion, from the annular turbine gas chamber 68 by way of conduit 22 and through duct 21 to the annular port 20 which discharges by way of the nozzles formed by nozzle guide blades 24 through the gas course 31 of unit A2. The valves for control which have been just above described constitute the control means generally designated as C.

The annular turbine gas chamber 68 discharges by way of nozzles formed by the nozzle guide blades 98 to the annular turbine gas course 99 formed between the turbine rotor 63 and the casing B2 in which the turbine rotor blades rotate. Thus combustion gases at the same pressure substantially as the combustion gases passing through the main power turbine pass through the turbine unit A2 of the fuel supply unit A to form driving fluid for that turbine. The compressed air discharge chamber 67 has a port 100 which discharges some of the compressed air compressed by the compressor rotor blades 62 to the conduit 38 before there is any admixture of fuel or combustion gases with that portion of the compressed air. Thus this portion of the compressed air, a relatively small proportion of that compressed air, is passed under pressure, as air only, to the intake chamber 37 of the air compressing unit A1 of the fluid supply unit A, to be further compressed and discharged as such higher compressed air, but bearing fuel from nozzles 42, to the pipe 40 and thereby to the annular fuel distribution chamber 60 of the main or power turbine engine. The port 100 discharges to the pipe 38 and as it passes through pipe 38 that compressed air may have some of the heat of compression removed by means of an intermediate air cooling means comprised of the fins 101, annular in form about pipe 38. This intermediate intercooler means is shown only diagrammatically to illustrate that there may be intercooling, and it may be noted that any such intercooling means may be used, for such intermediate cooling as may be necessary, to prevent too high temperature of the compressed air to be mixed with fuel in chamber 39. Some heating of the air is not objectionable, and in some cases, no intercooling may be necessary, in order that the fuel may be heated in the admixture process. This use of intercooling would depend largely on the nature of the fuel to be used with the device.

The governor lever 83 is normally pulled by a tension spring 102 to keep the valve 91 in the rightward position, Figure 1, so that the port 97 therein permits passage of gases, this valve port 97 being thus open, normally, and at all times, except when the fuel supply control governor means (of unit A), has failed to prevent increasing speed of the power turbine shaft 73, so that the safe or critical speed is exceeded. In other words, the main control governor, that of unit B, is not effective unless the governor of the fuel supply unit A has failed to decrease the supply of fuel before that critical speed is exceeded. The governor of unit B thus is an emergency governor and does not have any effect unless the control provided by the fuel supply unit A, fails to properly control the main power unit in time.

The hand control or pilot controlled valve 95 has fixed on its shaft 103 a large worm wheel 104 which is in permanent engagement with a small worm 105 and the latter is fixed on a shaft 106, rotatable in bracket 107 fixed on unit A, and that shaft 106, a control shaft, has fixed on it knurled knob 108 by which the valve 95 may be manually turned to close or partially close the port 94 between the other valve control means and conduit 22 and port 21. This control by valve 95 is the pilot's control to enable him to decrease the supply of fuel per unit of time, and to decrease the speed of the rotors of the main power turbine unit B. By this hand control (or any remote hand control by means of extension shaft 109) the pilot controls the power output of unit B, the other controls, that by the governor of unit B, and that by the governor of unit A, being the safety controls which become effective to prevent excess speed. In any construction, where it is desired that the speed be constant, the hand control need not be used, except for emergency, as the governor of unit A would control the output to maintain speed. Either of the governor controls may be dispensed with and the other serve as the sole governor control, but it is preferable that both be used.

The annular fuel distributing chamber 60 discharges the mixture of fuel and compressed air to the annular combustion chamber 69 by means of a multiple number of fuel or mixture nozzles 110 which discharge fuel and the compressed air from chamber 60 in a somewhat tangential manner, as illustrated in Figure 2, so that all the mixture, from all nozzles 110, will discharge in a rotative direction annularly of combustion chamber 69 and thus tend to circulate or rotate that mixture with compressed air passing additionally into combustion chamber 69, so that by this rotation a better admixture of the fuel mixture with the combustion air is obtained. It should be observed, especially, that the ratio of fuel discharged by nozzles 42 from pump 48 is always of such a high proportion to the quantity of compressed air passing through unit A1, that there will not be combustion in the chamber 39, or the conduit 40, or the distributing chamber 60, and so that thus combustion will be only in the combustion chamber 69 of the main unit B. The metal of the nozzles 110 may be so thick, and the relative size of the cross sectional area of each nozzle, so small, and the speed of passage by nozzles 110, so great, that combustion propagation backwardly in the stream, is not effected. The proportion of compressed air mixed with fuel in distributing chamber 60 is so small that combustion cannot be supported therein, and even if some should occur that would not materially affect the operation. The construction should be such, however, by the design of the structure that such precombustion, would not be permitted, and any type of back-fire preventing means, such as are commonly used, may be incorporated, if that be found desirable.

Having described in detail the elements comprising the construction, and certain details of its operation, the operation in general, is now described, briefly. Any type of fuel that is fluid, such as gasoline, kerosene, diesel fuel, natural gas or other gaseous fuels, or other liquid or flowing fuels, may be used, to be supplied by pipe 51 to pump 48. The pilot or operator, having provided the ignition means 72 with electric ignition, current, in any manner, places the pilot's control valve 95 in the position to permit passage, and he then causes current to flow, for starting (in any manner), to the starting motor A5, whereupon the shaft 2 of the unit A is rotated. Simultaneously he will cause any other starting means such as is commonly supplied with turbine power units, to be energized to start the shaft 73 in rotation, the proper way. A starting pulley or gear is diagrammatically shown by element 111 fixed to shaft 73 and whatever starting motor means is used with the unit B, it may deliver its power through element 111. The combustion in chamber 69 will then ensue. As shaft 2 of fuel supply unit A rotates it will turn the compressor rotor and this will compress air flowing to chamber 37 and pass the air to chamber 39 where fuel pumped from pump 48 will be atomized or highly disintegrated so that it will mix very thoroughly with the air compressed into chamber 39, and this mixture will flow by way of pipe 40 to distributing chamber 60, whence the mixture will pass by nozzles 110 to combustion chamber 69, there being combustion with the main air supply under compression, which flows directly from the compressor of unit B through space 67 to the leftward end of combustion chamber 69. This main supply of compressed air will be much larger than that supplied to chamber 37 and may be as much as ten times the quantity of air supplied to chamber 37. However, some of the compressed air passes directly from the compressor of unit B through the spaces or passages 112 formed between nozzles 110 (that is between their enclosing material), and some also flows through the annular passage 113, that is some air flows on each side of the annular walls of the combustion chamber 69, to cool the walls. This cooling air may be as much as five or more times the air flowing through the combustion chamber 69. These flows will unite in the combustion gas space 68, in the manner which is common to turbines. The flow of compressed air to chamber 37 may be say one tenth or even less of the total other air flow in the main power unit B, but it must be such as will ensure adequate flow of air to carry the fuel as admixed with it in chamber 39. This proportion may be best determined in the correct amounts in any construction.

As combustion occurs in the unit B the combustion gases in the major part thereof, will flow through the turbine course 99 of the unit B to drive the turbine rotor 63 of unit B and thereby the compressor rotor of unit B, and to provide thereby the power upon shaft 73, which is necessary for use of the unit B as a power unit, say for the driving of any work device which the shaft 73 may be connected with, or will supply the power by the jet expulsion from the jet tube 78, the latter exhausting to atmosphere, as in jet propulsion means, commonly used. The element 111 or any power transmission means may be used for driving of any work device.

Part of the combustion gases, under pressure, will be diverted from the combustion gas chamber or nozzle chamber 68 through the pipe 22, and this part, only of such proportion as may be found necessary, will be permitted to pass to chamber 23 of unit A whence it will pass through the turbine course of unit A and drive the turbine rotor A4 to thereby drive the compressor rotor A3 of unit A and also to thereby drive the fuel pump 48, at the same proportionate speed. This flow of combustion gases, after passing the turbine of unit A, will flow by pipe 33 to the jet tube 78 to be ejected to atmosphere with exhaust gases therein. This flow of gases through turbine A2 of unit A will continue uninterruptedly, in the predetermined quantity, and as necessary, to drive the shaft 2, but this driving will be initially governed and normally governed by the fuel supply unit governor 6—7 and valve 10, the valve 10 being moved rightwardly, Figure 1, to partially or wholly cover annular port 20 and thereby decrease the flow, whenever the governed speed is exceeded, this speed being that speed which is predetermined to not exceed the speed which provides the quantity of fuel necessary to drive the shaft 73 at a predetermined speed of not exceeding the safe speed as a maximum speed. That is, governor 6—7 of unit A will decrease the flow of driving fluid by pipe 22 to drive shaft 2, so that the unit A will not supply fuel to unit B in excess of that quantity which is necessary to drive shaft 73 at not exceeding the saft speed, which may be as predetermined by the construction. The compression of spring 11 will be adjusted so that the governor may provide this control, as described. This operation and governor control by governor 6—7 and valve 10, governing the flow of driving gases, should be such as to normally determine the speed of shaft 73 by limiting the flow of fuel to unit B, and that will normally be the case since, even if shaft 73 slightly exceeds that speed it will not get increased flow of fuel to unit B, as unit A is governed by governor 6—7. Thus at all times, normally, excess speed will be prevented by governor 6—7 and valve 10, because the shaft 2 cannot rotate at higher than the controlled speed and pump 48 cannot therefore function at a higher speed, either.

In the event, that the shaft 2 does not respond on account of any failure, to the governor control, in the unit A, then if shaft 73 should exceed by more than a slight degree, the speed, as determined by the governor of unit A, the main governor control of unit B, that provided by governor arms 79 and member 82 and lever 83 will become effective, and this governor will then move the valve 91 leftwardly, Figure 1, and the valve body will then partially or wholly close port 97 through the valve, so that thus, this valve 91 will then serve to decrease the flow of combustion gases from the combustion chamber of unit B, to drive the turbine of unit A, and thus fuel supply will decrease. Overall this control, however, the pilot's control by pilot control valve 95 is superimposed, so that he may decrease turbine speed of unit B or stop rotation of shaft 73 completely, and thus power output will cease, or be diminished. The by-pass fuel valve 53 is not necessarily ever used, but may be used by the pilot as an emergency control to stop flow of fuel, this valve normally being completely closed.

The unit A and the rotors on shaft 2 are relatively small as compared to the unit B and the rotors on the shaft 73, especially in the diameters of the rotors, and therefore the shaft 2 and its rotors may revolve at a relatively high speed, say a speed as high as twenty to forty thousand rotations per minute, whereas the shaft 73 and its rotors may rotate at a speed which may be say ten to fifteen thousand rotations per minute, depending on its size and especially its diameter. Therefore, the rotors of shaft 2 may readily be rotated at the speed by which the compressor rotor A3 may compress air to a pressure at least as much greater than the pressure of air in the main turbine, as may be necessary to procure the adequate distribution of the fuel in the means illustrated and described.

The control valve means has been shown by certain detailed constructions, but it should especially be observed that these valves may be of any type such as valves may have, and the governors may operate upon them or the valve means in any manner, so that the governor means performs the function of governing the speed.

I have shown in connection with my invention or as a functional means in its illustration, the axial flow types of air compressing means and power turbine or turbine means as units in the primary means and as units in the secondary or fuel supplying unit, but I do not thereby intend to exclude as units which may be used with my invention such types of air compressors as the centrifugal or other rotary types of air compressing means, and I do not intend to exclude as units which may be used with my invention, such types of turbines as other types which are well known in the art of turbines namely the radial inflow types or any other types.

While I have shown particular detailed devices in the illustration of my invention, I contemplate that other detailed devices and combinations of devices, may be used in the realization of my invention, without departing from the principles therefrom and the claimed invention.

What I claim is:

1. In means for fuel supply to a turbine; a primary power turbine for power development having an air intake and primary air compressing means and a primary power turbine rotor having a driving element in driving connection with the primary air compressing means and having a combustion chamber means in conductive connection between the primary air compressing means and the primary power turbine rotor to pass combustion products for driving the primary power turbine rotor;

a secondary turbine having a driving element and secondary turbine rotor in driving connection with the last named driving element, a fuel pumping means having a driven pumping element in driven connection and coordination with the driving element of the secondary turbine, a secondary air compressing means having a driven element in driven connection and coordination with the driving element of the secondary turbine; a distributing conduit having a conductive connection with the discharge from the secondary air compressing means, a means in conductive connection with the fuel pumping means to receive fuel as pumped thereby and having a fuel discharge discharging fuel to the conductive connection between the secondary air compressing means and the distributing conduit, and air and fuel mixture nozzles discharging from the distributing conduit to the combustion chamber means between the primary air compressing means and the primary power turbine rotor.

2. All of the means as described and as claimed in claim 1 and in combination; the secondary turbine including with it means to pass a driving fluid through it for driving the secondary turbine rotor and having in driven connection with the driving element of the secondary turbine rotor a governing means in controlling relation with the means to pass driving fluid through the secondary turbine to thereby control the speed of the secondary turbine rotor and the rate of air compression and fuel pumping thereby.

3. All of the means as described and as claimed in claim 1 and in combination; the primary power turbine rotor having a governing means in driven connection with the primary power turbine rotor and a controlling connection between the said governing means and the secondary turbine to control the speed of the secondary turbine rotor and thereby control the rate of air compression and fuel pumping thereby.

4. All of the means as described and as claimed in claim 1 and in combination; the secondary turbine including with it means to pass a driving fluid through it for driving the secondary turbine rotor and having a controlling means in relation with the said last named means to pass driving fluid through the secondary turbine to thereby control the speed of rotation of the secondary turbine rotor and the rate of air compression and fuel pumping by the means in driving connection with the secondary turbine rotor.

5. In means for supply of fuel to a turbine; a primary power turbine for power development having an air intake and primary air compressing means and a primary power turbine rotor having a driving element in driving connection with the primary air compressing means and having a combustion chamber means in conductive connection between the primary air compressing means and the primary power turbine rotor to pass combustion products for driving the primary power turbine rotor; a secondary air compressing means to supply compressed air at a pressure above the pressure of air compressed by the primary compressing means, and means rotating independently without mechanical rotation connection with the primary power turbine rotor to drive the secondary air compressing means, and fuel pumping means in driving connection and coordination with the secondary air compressing means and the means rotating to drive the secondary air compressing means; a mixing chamber receiving air compressed by the secondary air compressing means; a distributing conduit in conductive connection with the said mixing chamber to receive a mixture of fuel and air under compression from the mixing chamber; a multiple number of nozzles discharging from the distributing conduit to the said combustion chamber means to mix the mixture of fuel and air with air for combustion in the combustion chamber means; the means rotating the secondary air compressing means and driving the fuel pumping means having in driving connection therewith a governor means in controlling relation with this means to thereby control the speed of the secondary air compressing means and the fuel pumping means and the rate of air compression by the secondary air compressing means and fuel pumping by the fuel pumping means so that the mixture is maintained in substantial proportion and both the secondary air compression and the fuel pumping is in proportion to the speed of the means driving the secondary air compressing means and the fuel pumping means.

6. In means for supply of fuel to a turbine: a primary power turbine for power development having an air intake and primary air compressing means and a primary power turbine rotor having a driving element in driving connection with the primary air compressing means and having a combustion chamber means in conductive connection between the primary air compressing means and the primary power turbine rotor to pass combustion products for driving the primary power turbine rotor; a secondary air compressing means to supply compressed air at a pressure above the pressure of air compressed by the primary compressing means, and means rotating independently without mechanical rotation connection with the primary power turbine rotor to drive the secondary air compressing means, and fuel pumping means in driving connection and coordination with the secondary air compressing means and the means rotating to drive the secondary air compressing means; a mixing chamber receiving air compressed by the secondary air compressing means; a distributing conduit in conductive connection with the said mixing chamber to receive a mixture of fuel and air under compression from the mixing chamber; a multiple number of nozzles discharging from the distributing conduit to the said combustion chamber means to mix the mixture of fuel and air with air for combustion in the combustion chamber means; the primary power turbine having a governing means in driven connection with the primary power turbine rotor and a controlling connection between the said governing means and the means driving the secondary air compressing means and the fuel pumping means.

7. In means for supply of fuel to a turbine: a primary power turbine for power development having an air intake and primary air compressing means and a primary power turbine rotor having a driving element in driving connection with the primary air compressing means and having a combustion chamber means in conductive connection between the primary air compressing means and the primary power turbine rotor to pass combustion products for driving the primary power turbine rotor; a secondary air compressing means to supply compressed air at a pressure above the pressure of air compressed by the primary compressing means, and means rotating independently without mechanical rotation connection with the primary power turbine rotor to drive the secondary air compressing means, and fuel pumping means in driving connection and coordination with the secondary air compressing means and the means rotating to drive the secondary air compressing means; a mixing chamber receiving air compressed by the secondary air compressing means; a distributing conduit in conductive connection with the said mixing chamber to receive a mixture of fuel and air under compression from the mixing chamber; a multiple number of nozzles discharging from the distributing conduit to the said combustion chamber means to mix the mixture of fuel and air with air for combustion in the combustion chamber means; a controlling means in relation with the means driving the secondary air compressing means and the fuel pumping means to control the speed of this means and to thereby control the rate of air compressing by the secondary air compressing means and the rate of fuel pumping by the fuel pumping means.

8. In means for supply of fuel to a turbine; a primary power turbine for power development having an air intake and primary air compressing means and a primary power turbine rotor having a driving element in driving connection with the primary air compressing means and having a combustion chamber means in conductive connection between the primary air compressing means and the primary power turbine rotor to pass combustion products for driving the primary power turbine rotor; a secondary turbine having a driving element and a secondary turbine rotor in driving connection with the last named secondary turbine driving element, and an entry chamber to the secondary turbine for entry of driving fluid thereto, and a discharge from the secondary turbine; a fuel pumping means having a driven element in driving connection and coordination with the secondary turbine driving element and means for supply of fuel to the fuel pumping means; a secondary air compressing means having a driven air compressing element in driven connection and coordination with the secondary turbine driving element and having a secondary air entry chamber for entry of air to the secondary air compressing means; a means connecting the secondary turbine rotor and the fuel pumping means and the secondary driven air compressing element in driving connection and coordination so that this means is rotated in coordination and at proportionate speed or speeds; a distributing conduit having a conductive connection with the discharge from the secondary air compressing means to receive air compressed in the secondary air compressing means; a means in conductive connection with the fuel pumping means to receive fuel as pumped thereby and having a fuel discharge discharging fuel to the conductive connection between the secondary air compressing means and the distributing conduit for admixture of the fuel with air passing therethrough; air and fuel mixture nozzles discharging air and fuel mixture from the distributing conduit to the combustion chamber means between the primary air compressing means and the primary power turbine; and means forming conductive connection between the secondary turbine entry chamber and the means passing gaseous fluid to the primary power turbine rotor to supply driving fluid for the secondary turbine rotor.

9. All of the means as described and as claimed in claim 8, and in combination; a governing means in driven connection with the secondary turbine rotor and having a controlling element and means in connection with the controlling element to modify the passage of driving fluid to the secondary turbine entry chamber to thereby control the speed of the secondary turbine rotor and the rate of air compression by the secondary air compressing means and the rate of fuel pumping by the fuel pumping means to supply fuel to the air compressed by the secondary air compressing means.

10. All of the means as described and as claimed in claim 8, and in combination; a controlling means in relation with the means passing driving fluid to the secondary turbine entry chamber to modify the flow of driving fluid therethrough and to thereby modify the speed of the secondary turbine rotor and the rate of air compression by the secondary air compressing means and the rate of supply of fuel by the fuel pumping means.

11. All of the means as described and as claimed in claim 8 and in combination; the said fuel discharge discharging fuel to the conductive connection between the secondary air compressing means and the distributing conduit including, a rotatable discharge means rotatably mounted and drivably connected with the driving element of the secondary turbine and having nozzles rotating with the said rotatable discharge means and discharging under centrifugal force to disseminate the fuel into the passing compressed air stream.

12. In means for supply of fuel to a turbine; a primary power turbine for power development having an air intake and primary air compressing means and a primary power turbine rotor with a driving element in driving connection with the primary air compressing means and having a combustion chamber means in conductive connection between the primary air compressing means and the primary power turbine rotor to pass combustion products for driving the primary power turbine rotor; a secondary turbine having a driving element and a secondary turbine rotor in driving connection with the last named secondary turbine driving element, and an entry chamber to the secondary turbine for entry of driving fluid thereto, and a discharge from the secondary turbine; a fuel pumping means having a driven element in driving connection and coordination with the secondary turbine driving element and means for supply of fuel to the fuel pumping means; a secondary air compressing means having a driven air compressing element in driven connection and coordination with the secondary turbine driving element and having a secondary air entry chamber for entry of air to the secondary air compressing means; a conductive connection between the secondary air entry chamber of the secondary air compressing means and the primary air compressing means to pass some of the air compressed by the primary air compressing means to the secondary air compressing means; a means connecting the secondary turbine rotor and the fuel pumping means and the secondary driven air compressing element in driving connection and coordination so that this means is rotated in coordination and at proportionate speed or speeds; a distributing conduit having a conductive connection with the discharge from the secondary air compressing means to receive air compressed in the secondary air compressing means; a means in conductive connection with the fuel pumping means to receive fuel as pumped thereby and having a fuel discharge discharging fuel to the conductive connection between the secondary air compressing means and the distributing conduit for admixture of the fuel with air passing therethrough; air and fuel mixture nozzles discharging air and fuel mixture from the distributing conduit to the combustion chamber means between the primary air compressing means and the primary power turbine; and means forming conductive connection between the secondary turbine entry chamber and the means passing gaseous fluid to the primary power turbine rotor to supply driving fluid for the secondary turbine rotor.

13. All of the means as described and as claimed in claim 12 and in combination; a governing means in driven connection with the secondary turbine rotor and having a controlling element and means in connection with the controlling element to modify the passage of driving fluid to the secondary turbine entry chamber to thereby control the speed of the secondary turbine rotor and the rate of air compression by the secondary air compressing means and the rate of fuel pumping by the fuel pumping means to supply fuel to the air compressed by the secondary air compressing means.

14. All of the means as described and as claimed in claim 12 and in combination; a controlling means in relation with the means passing driving fluid to the secondary turbine entry chamber to modify the flow of driving fluid therethrough and to thereby modify the speed of the secondary turbine rotor and the rate of air compression by the secondary air compressing means and the rate of supply of fuel by the fuel pumping means.

15. All of the means as described and as claimed in claim 12 and in combination; the said fuel discharge discharging fuel to the conductive connection between the secondary air compressing means and the distributing conduit, including, a discharge means rotatably mounted and drivably connected with the driving element of the secondary turbine and having nozzles rotating with the means and discharging under centrifugal force to disseminate the fuel into the passing compressed air stream.

16. All of the means as described and claimed in claim 12 and in combination; the said distributing conduit annularly disposed relative to the axis of the primary power turbine and the said air and fuel mixture nozzles having location at points spaced about the said axis to distribute the fuel and air mixture at spaced locations of the combustion chamber means.

17. All of the means as described and as claimed in claim 12 and in combination; the said secondary turbine driving element having operably related therewith a starting motor means to contribute initial driving impulse to the secondary turbine driving element and the means in driven relation therewith.

18. In means for fuel supply to a turbine; a primary power turbine for power development having an air intake and primary air compressing means and a primary power turbine rotor having a driving element in driving connection with the primary air compressing means and having a combustion chamber means in conductive connection between the primary air compressing means and the primary power turbine rotor to pass combustion products for driving the primary power turbine rotor; a secondary turbine having a driving element and secondary turbine rotor in driving connection with the last named driving element, a fuel pumping means having a driven pumping element in driven connection and coordination with the driving element of the secondary turbine, a secondary air compressing means having a driven element in driven connection and coordination with the driving element of the secondary turbine; a nozzle means having a conductive connection with the discharge from the secondary air compressing means, a means in conductive connection with the fuel pumping means to receive fuel as pumped thereby and having means discharging fuel to the conductive connection between the secondary air compressing means and the nozzle means, the said nozzle means discharging to the combustion chamber means between the primary air compressing means and the primary power turbine rotor, and means in connection with the secondary turbine to pass a driving fluid through it for driving the secondary turbine rotor.

References Cited in the file of this patent

UNITED STATES PATENTS

| | | |
|---|---|---|
| 2,470,184 | Pfenninger | May 17, 1949 |
| 2,482,791 | Nettel et al. | Sept. 27, 1949 |
| 2,487,435 | Goddard | Nov. 8, 1949 |
| 2,531,761 | Zucrow | Nov. 28, 1950 |
| 2,592,749 | Sédille et al. | Apr. 15, 1952 |
| 2,643,511 | Briggs | June 30, 1953 |
| 2,651,175 | Griffith | Sept. 8, 1953 |

FOREIGN PATENTS

| | | |
|---|---|---|
| 627,644 | Great Britain | Aug. 12, 1949 |